United States Patent
Gordon et al.

(10) Patent No.: US 12,330,303 B2
(45) Date of Patent: Jun. 17, 2025

(54) ONLINE AUGMENTATION OF LEARNED GRASPING

(71) Applicant: Honda Motor Co., Ltd., Tokyo (JP)

(72) Inventors: Ethan K. Gordon, Seattle, WA (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 17/940,267

(22) Filed: Sep. 8, 2022

(65) Prior Publication Data

US 2023/0339107 A1    Oct. 26, 2023

Related U.S. Application Data

(60) Provisional application No. 63/333,772, filed on Apr. 22, 2022.

(51) Int. Cl.
*B25J 9/16* (2006.01)
*B25J 13/00* (2006.01)

(52) U.S. Cl.
CPC .............. *B25J 9/163* (2013.01); *B25J 13/006* (2013.01)

(58) Field of Classification Search
None
See application file for complete search history.

(56) References Cited

U.S. PATENT DOCUMENTS

| | | | | |
|---|---|---|---|---|
| 9,649,764 | B1 * | 5/2017 | Sun | B25J 13/025 |
| 2008/0077361 | A1 * | 3/2008 | Boyd | G06F 30/00 |
| | | | | 702/1 |
| 2020/0055680 | A1 * | 2/2020 | Chavan Dafle | B25J 15/0004 |
| 2021/0031375 | A1 * | 2/2021 | Drumwright | B25J 9/1612 |
| 2021/0125052 | A1 * | 4/2021 | Tremblay | G06N 3/08 |
| 2022/0398283 | A1 * | 12/2022 | Mannor | G06N 3/006 |

OTHER PUBLICATIONS

Hillenbrand, U. & Brunner, B. & Borst, Christoph & Hirzinger, G.. (2004). The Robutler: a Vision-Controlled Hand-Arm System for Manipulating Bottles and Glasses. (Year: 2004).*
R. S. Zarrin, K. Yamane, and R. Jitosho, "Hybrid Learning- and Model Based Planning and Control of In-Hand Manipulation," arXiv:2209.10040v1.

(Continued)

*Primary Examiner* — Jaime Figueroa
*Assistant Examiner* — Jerrod Irvin Davis
(74) *Attorney, Agent, or Firm* — Rankin, Hill & Clark LLP

(57) ABSTRACT

Systems and methods for online augmentation for learned grasping are provided. In one embodiment, a method is provided that includes identifying an action from a discrete action space. The method includes identifying a second set of grasps of the agent utilizing a transition model based on the action and at least one contact parameter. The at least one contact parameter defines allowed states of contact for the agent. The method includes applying a reward function to evaluate each grasp of the second set of grasps based on a set of contact forces within a friction cone that minimizes a difference between an actual net wrench on the object and a predetermined net wrench. The reward function is optimized online using a lookahead tree. The method includes selecting a next grasp from the second set. The method includes causing the agent to execute the next grasp.

20 Claims, 6 Drawing Sheets

(56) References Cited

OTHER PUBLICATIONS

S. Abondance, C. B. Teeple, and R. J. Wood, "A dexterous soft robotic hand for delicate in-hand manipulation," IEEE Robotics and Automation Letters, vol. 5, No. 4, pp. 5502-5509, 2020.

O. M. Andrychowicz, B. Baker, M. Chociej, R. Jozefowicz, B. McGrew, J. Pachocki, A. Petron, M. Plappert, G. Powell, A. Ray et al., "Learning dexterous in-hand manipulation," The International Journal of Robotics Research, vol. 39, No. 1, pp. 3-20, 2020.

Y. Bai and C. K. Liu, "Dexterous manipulation using both palm and fingers," in 2014 IEEE International Conference on Robotics and Automation (ICRA), 2014, pp. 1560-1565.

A. Ben-Israel, Dynamic Programming and Optimal Control: vol. I. Athena Scientific, 2012, google-Books-ID: qVBEEAAAQBAJ.

D. Bertsekas, "Lessons from AlphaZero for Optimal, Model Predictive, and Adaptive Control," arXiv:2108.10315 [cs, math], Aug. 2021, arXiv: 2108.10315. [Online]. Available: http://arxiv.org/abs/2108.10315.

G. Brockman, V. Cheung, L. Pettersson, J. Schneider, J. Schulman, J. Tang, and W. Zaremba, "Openai gym," arXiv preprint arXiv:1606.01540, 2016.

N. Chavan-Dafle and A. Rodriguez, "Prehensile pushing: In-hand manipulation with push-primitives," in 2015 IEEE/RSJ International Conference on Intelligent Robots and Systems (IROS). IEEE, 2015, pp. 6215-6222.

N. C. Dafle, A. Rodriguez, R. Paolini, B. Tang, S. S. Srinivasa, M. Erdmann, M. T. Mason, I. Lundberg, H. Staab, and T. Fuhlbrigge, "Extrinsic dexterity: In-hand manipulation with external forces," in 2014 IEEE International Conference on Robotics and Automation (ICRA). IEEE, 2014, pp. 1578-1585.

S. Guadarrama, A. Korattikara, O. Ramirez, P. Castro, E. Holly, S. Fishman, K. Wang, E. Gonina, N. Wu, E. Kokiopoulou, L. Sbaiz, J. Smith, G. Bartók, J. Berent, C. Harris, V. Vanhoucke, and E. Brevdo, "TF-Agents: A library for reinforcement learning in tensorflow," https://github.com/tensorflow/agents, 2018, [Online; accessed Jun. 25, 2019]. [Online]. Available: https://github.com/tensorflow/agents.

T. Hasegawa, H. Waita, T. Kawakami, Y. Takemura, T. Ishikawa, Y. Kimura, C. Tanaka, K. Sugiyama, and T. Yoshiike, "Powerful and dexterous multi-finger hand using dynamical pulley mechanism," in 2022 International Conference on Robotics and Automation (ICRA). IEEE, 2022, pp. 707-713.

R. Jena, C. Liu, and K. Sycara, "Augmenting GAIL with BC for sample efficient imitation learning," Jan. 2020. [Online]. Available: https://arxiv.org/abs/2001.07798v4.

L. Kavraki, P. Svestka, J.-C. Latombe, and M. Overmars, "Probabilistic roadmaps for path planning in high-dimensional configuration spaces," IEEE Transactions on Robotics and Automation, vol. 12, No. 4, pp. 566-580, 1996.

O. Kroemer, S. Niekum, and G. Konidaris, "A review of robot learning for manipulation: Challenges, representations, and algorithms," The Journal of Machine Learning Research, vol. 22, No. 1, pp. 1395-1476, 2021.

V. Kumar, E. Todorov, and S. Levine, "Optimal control with learned local models: Application to dexterous manipulation," in 2016 IEEE International Conference on Robotics and Automation (ICRA). IEEE, 2016, pp. 378-383.

T. Li, K. Srinivasan, M. Q.-H. Meng, W. Yuan, and J. Bohg, "Learning Hierarchical Control for Robust In-Hand Manipulation," arXiv:1910.10985 [cs], Oct. 2019, arXiv: 1910.10985. [Online]. Available: http://arxiv.org/abs/1910.10985.

M. Liarokapis and A. M. Dollar, "Deriving dexterous, in-hand manipulation primitives for adaptive robot hands," in 2017 IEEE/RSJ International Conference on Intelligent Robots and Systems (IROS). IEEE, 2017, pp. 1951-1958.

C. K. Liu, "Dextrous manipulation from a grasping pose," in ACM SIGGRAPH 2009 papers, 2009, pp. 1-6.

I. Mordatch, Z. Popović, and E. Todorov, "Contact-invariant optimization for hand manipulation," in Proceedings of the ACM SIGGRAPH/ Eurographics symposium on computer animation, 2012, pp. 137-144.

A. Nagabandi, K. Konolige, S. Levine, and V. Kumar, "Deep dynamics models for learning dexterous manipulation," in Conference on Robot Learning. PMLR, 2020, pp. 1101-1112.

S. Nasiriany, H. Liu, and Y. Zhu, "Augmenting reinforcement learning with behavior primitives for diverse manipulation tasks," in 2022 International Conference on Robotics and Automation (ICRA). IEEE, 2022, pp. 7477-7484.

A. Okamura, N. Smaby, and M. Cutkosky, "An overview of dexterous manipulation," in Proceedings 2000 ICRA. Millennium Conference. IEEE International Conference on Robotics and Automation. Symposia Proceedings (Cat. No. 00CH37065), vol. 1, Apr. 2000, pp. 255-262 vol. 1, iSSN: 1050-4729.

I. Radosavovic, X. Wang, L. Pinto, and J. Malik, "State-only imitation learning for dexterous manipulation," in 2021 IEEE/RSJ International Conference on Intelligent Robots and Systems (IROS). IEEE, 2021, pp. 7865-7871.

A. Rajeswaran, V. Kumar, A. Gupta, G. Vezzani, J. Schulman, E. Todorov, and S. Levine, "Learning complex dexterous manipulation with deep reinforcement learning and demonstrations," arXiv preprint arXiv:1709.10087, 2017.

J. Schulman, F. Wolski, P. Dhariwal, A. Radford, and O. Klimov, "Proximal policy optimization algorithms," 2017. [Online]. Available: https://arxiv.org/abs/1707.06347.

D. Silver, T. Hubert, J. Schrittwieser, I. Antonoglou, M. Lai, A. Guez, M. Lanctot, L. Sifre, D. Kumaran, T. Graepel, T. Lillicrap, K. Simonyan, and D. Hassabis, "Mastering Chess and Shogi by Self-Play with a General Reinforcement Learning Algorithm," Dec. 2017. [Online]. Available: https://arxiv.org/abs/1712.01815v1.

A. Singh, H. Liu, G. Zhou, A. Yu, N. Rhinehart, and S. Levine, "Parrot: Data-driven behavioral priors for reinforcement learning," arXiv preprint arXiv:2011.10024, 2020.

H. Van Hoof, T. Hermans, G. Neumann, and J. Peters, "Learning robot in-hand manipulation with tactile features," in 2015 IEEE-RAS 15th International Conference on Humanoid Robots (Humanoids). IEEE, 2015, pp. 121-127.

F. E. Viña B., Y. Karayiannidis, K. Pauwels, C. Smith, D. Kragic, "In-hand manipulation using gravity and controlled slip," in 2015 IEEE/RSJ International Conference on Intelligent Robots and Systems (IROS). IEEE, 2015, pp. 5636-5641.

C. Yu and P. Wang, "Dexterous Manipulation for Multi-Fingered Robotic Hands With Reinforcement Learning: A Review," Frontiers in Neurorobotics, vol. 16, 2022. [Online]. Available: https://www.frontiersin.org/articles/10.3389/fnbot.2022.861825.

* cited by examiner

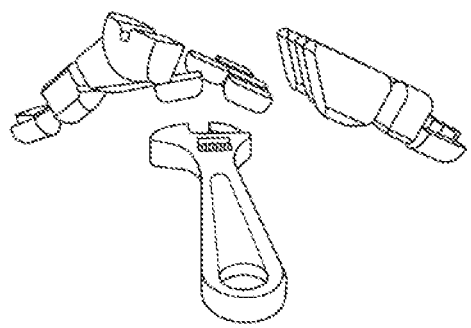
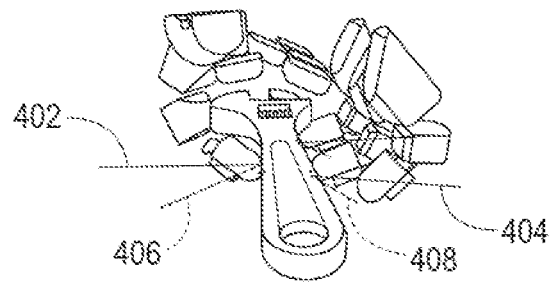
FIG. 4A　　　　　　　　FIG. 4B
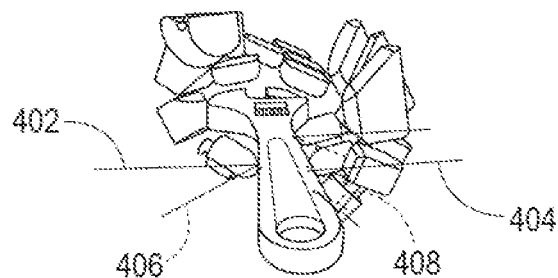
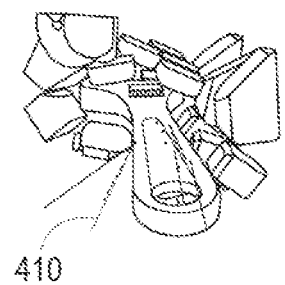
FIG. 4C　　　　　　　　FIG. 4D
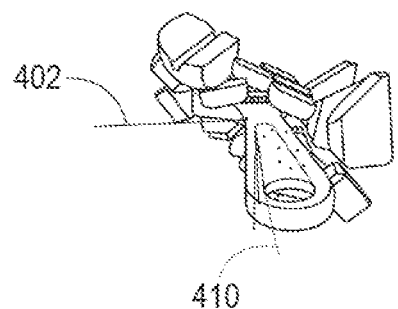
FIG. 4E

ONLINE AUGMENTATION OF LEARNED GRASPING

CROSS-REFERENCE TO RELATED APPLICATIONS

This application claims the benefit of U.S. Provisional Patent Application, Ser. No. 63/333,772 entitled "SYSTEMS AND METHODS FOR ONLINE AUGMENTATION OF LEARNED GRASPING", filed on Apr. 22, 2022; the entirety of the above-noted application(s) is incorporated by reference herein. The present application is related to co-pending U.S. patent application Ser. No. 17/539,989 entitled OBJECT MANIPULATION, filed on Dec. 1, 2021. The co-pending application is incorporated herein by reference, but is not admitted to be prior art with respect to the present application.

BACKGROUND

Manipulation of objects is one of the remaining key challenges of robotics. In recent years, tremendous progress has been made in the area of data-driven grasp synthesis. Given an object, the goal is to infer a suitable grasp that adheres to certain properties, e.g. stability or functionality. For example, while a robot may be able to contact or even lift an object, applying forces, such as torque, to the object may require a grasp consistent with the forces.

BRIEF DESCRIPTION

In one embodiment, a system for online augmentation for learned grasping is provided. The system includes a processor and a memory storing instructions. When executed by the processor, the instructions cause the processor to identify an action from a discrete action space for an environment of an agent. The discrete action space includes a first set of grasps. The agent is able to grasp an object in the environment. The action is a grasp defined as at least one contact point pair having an agent contact point associated with the agent and an object contact point associated with the object. The instructions also cause the processor to identify a second set of grasps of the agent utilizing a transition model based on the action and at least one contact parameter. The at least one contact parameter defines allowed states of contact for the agent. The instructions also cause the processor to apply a reward function to evaluate each grasp of the second set of grasps based on the set of contact forces within a friction cone that minimizes the difference between an actual net wrench on the object and a predetermined net wrench. The reward function is optimized online using a lookahead tree. The instructions yet further cause the processor to select a next grasp from the second set of grasps based on the application of the reward function and cause the agent to execute the next grasp.

According to another aspect, a method for online augmentation for learned grasping is provided. The method includes identifying an action from a discrete action space for an environment of an agent. The discrete action space includes a first set of grasps. The agent is able to grasp an object in the environment. A grasp is defined as at least one contact point pair having an agent contact point associated with the agent and an object contact point associated with the object. The method includes identifying a second set of grasps of the agent utilizing a transition model based on the action and at least one contact parameter. The at least one contact parameter defines allowed states of contact for the agent. The method further includes applying a reward function to evaluate each grasp of the second set of grasps based on a set of contact forces within a friction cone that minimizes a difference between an actual net wrench on the object and a predetermined net wrench. The reward function is optimized online using a lookahead tree. The method yet further includes selecting a next grasp from the second set of grasps based on the application of the reward function. The method includes causing the agent to execute the next grasp.

According to one aspect, a method for augmentation for learned grasping, is provided. The method may include performing object path planning to determine partial state information. The object path planning may include an initial action, a next action, and an Nth action. The initial action, the next action, and the Nth action are grasps. A grasp is defined as at least one contact point pair having an agent contact point associated with the agent and an object contact point associated with the object, and wherein the at least one contact parameter defines allowed states of contact for the agent. The method also includes performing object trajectory optimization by assigning timestamps to the initial action, the next action, and the Nth action. The method may further include optimizing a reward function based on at iterative inverse kinematic procedure and wrench error to calculate a reward. The reward may be based on a difference between an estimated required wrench and an actual wrench, and wherein the reward is calculated for a node at an offline time during training and an online time during operation or a test. The method may yet further include generating an optimized sequence of actions based on the optimized reward function based on a deep reinforcement learning (DRL) policy trained based on the reward function. The method may also include augmenting the learned grasp with an online lookahead that generates an optimal policy between the current grasp and n-steps into the future. The method further includes implementing the reference object trajectory via the agent.

BRIEF DESCRIPTION OF THE DRAWINGS

FIG. 4A-4E are illustrations of an exemplary implementation of a system for object manipulation, according to one aspect.

DETAILED DESCRIPTION

Figure 1:
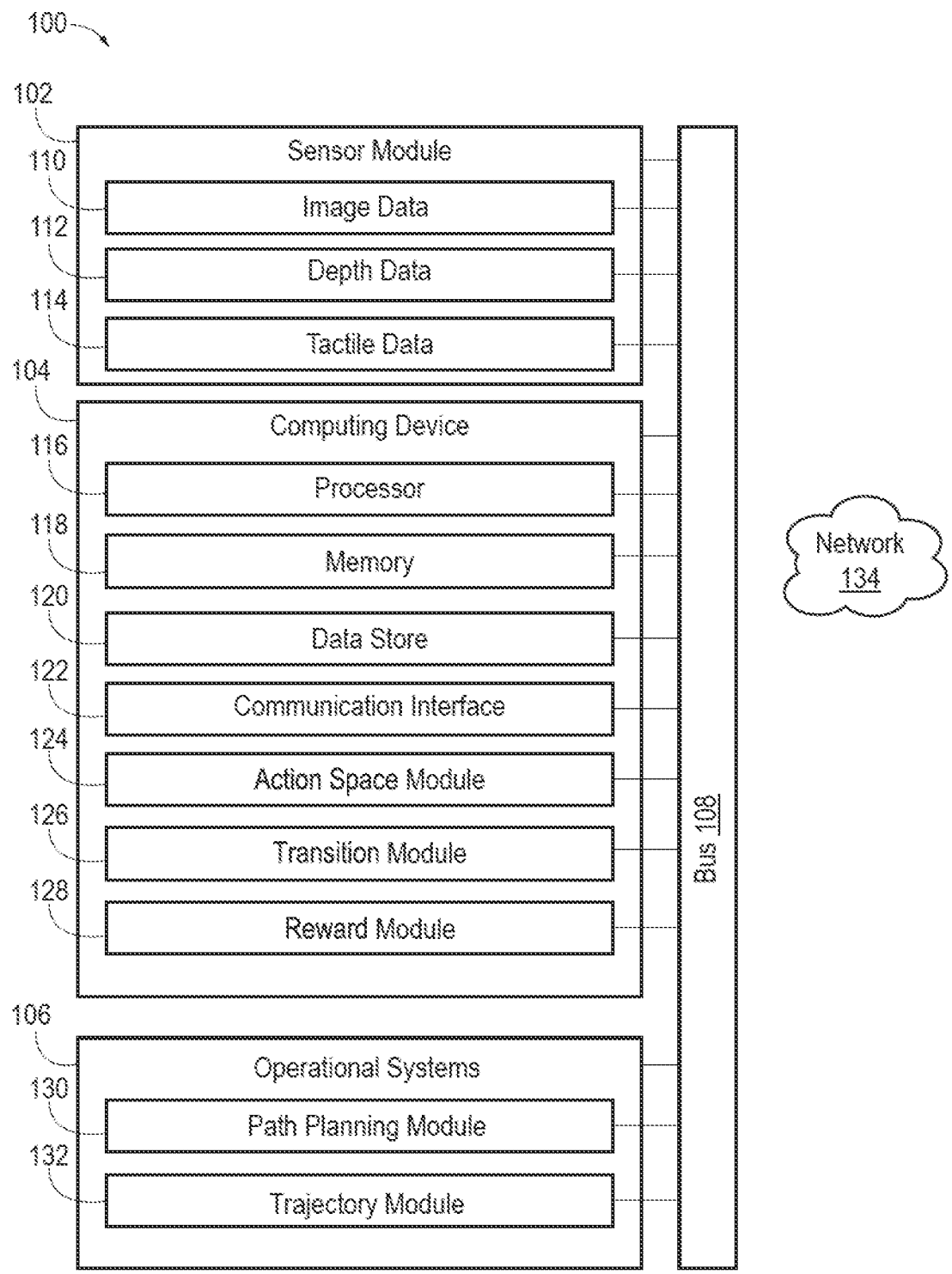
FIG. 1 is an exemplary component diagram of a system for online augmentation for learned grasping, according to one aspect.

Online augmentation for learned grasping is directed to the dexterous, in-hand manipulation of an object such as a rigid body (e.g., a wrench, hammer, etc.) through free space to perform some work on a given target or move the object to a target position in the environment. Work is defined as applying a specified force and/or torque on the given target.

The target may be quasi-static and, through the work, be able to move the target to the target position. For example, the target may be a screw that is to be moved in order to be tightened into a target position. Other example applications may include using a wrench to tighten a nut, using a screwdriver to tighten a screw, steadying a drill as it screws, or using a crow bar to pry open a box. Although, the object is described with respect to various tools, other objects may be used, such as handles, pulls, levers, dials, rotatable knobs, etc.

Previous models have difficulty determining a next possible grasp given the sheer amount of data involved in determining and/or learning next grasps. Here, contact parameters may reduce the amount of data by defining allowed states of contact for the agent. For example, if the agent has a plurality of end effector then a contact parameter may define that the agent is only able to move only one end effector at a time or per grasp to achieve a next grasp. As another example, a contact parameter may define a number of predetermined object contact points. The number of predetermined object contact points may be based on a grid associated with the object. Accordingly, the contact parameters define allowed states of contact for the agent.

A transition model may then be utilized to identify a second set of grasps of the agent based on the action and the at least one contact parameter. This may be performed iteratively to form a tree having a number of nodes each predicting one or more next grasps based on the previous grasp. The nodes may be evaluated based on a reward function that rewards the agent having a stable grasp on the object and penalizes unstable grasps of the object. For example, the reward function may evaluate each node based on the set of contact forces within a friction cone that minimizes the difference between an actual net wrench on the object and a predetermined net wrench. Likewise, the reward function may penalize grasps with higher force per contact point pair. The reward function may also penalize grasps that are kinematically unreachable for the fingers. Grasps may be selected for the agent at discrete points in time based on the evaluation of the nodes.

Previous methods suffer from slow runtime performance, or may require larger cumbersome amounts of training data. The methods described herein provide the optimal trajectory with significantly less computation time compared with a typical full dynamic programming based search method. For example, the systems and methods include a reward model based on physics of the scenario, so feasible and infeasible grasps can be determined without the need to run the planner on simulation or real-world for large number of iterations to acquire enough data to train the learning-based planner. Here, a learning-based planner is initialized with a model-based generated optimal policy. This significantly reduces the learning time for the agent. By contrast, determining the optimal grasp sequence for each evaluation trajectory may require close to 150 s of wall-clock time in parallel on a 32-core computer processing unit (CPU) in order to generate the reward matrices required to generate the optimal trajectory for each evaluation path. Meanwhile, 2-step lookahead achieved its significantly better performance with about 100 s on a single CPU. If implemented with the same parallelization (since each branch of the lookahead tree can be run on a separate thread), the systems and methods described herein take on the order of 10 s of wall-clock time over the course of the entire 16-step sequence and 1-step lookahead would take about 5 s. Accordingly, agents are able to compute grasp positions faster resulting in improvement in the technological field itself. Accordingly, the systems and methods described herein improve computer functioning and performance.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Agent" as used herein is a self-propelled machine that moves through or manipulates an environment. Exemplary agents can include, but is not limited to, robots, vehicles, or other self-propelled machines. The agent may be autonomously, semi-autonomously, or manually operated.

"Agent system," as used herein can include, but is not limited to, any automatic or manual systems that can be used to enhance the agent. Exemplary systems include, but are not limited to: an electronic stability control system, an anti-lock brake system, a brake assist system, an automatic brake prefill system, a low speed follow system, a cruise control system, a collision warning system, a collision mitigation braking system, a velocity control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pre-tensioning system, a monitoring system, a passenger detection system, a suspension system, and a sensory system among others.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. In one embodiment, a database can be stored, for example, at a disk, data store, and/or a memory. A database may be stored locally or remotely and accessed via a network.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine or computer readable media, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

I. System Overview

Referring now to the drawings, the drawings are for purposes of illustrating one or more exemplary embodiments and not for purposes of limiting the same. FIG. 1 is an exemplary component diagram of an operating environment 100 for online augmentation for learned grasping, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device 104 may be implemented as a part of an agent. The agent may be bipedal, two-wheeled, four-wheeled robot, vehicle, or self-propelled machine. The autonomous agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of an agent. In other embodiments, the components and functions of the computing device 104 can be implemented, for example, with other devices (e.g., a portable device) or another device connected via a network (e.g., a network 134). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
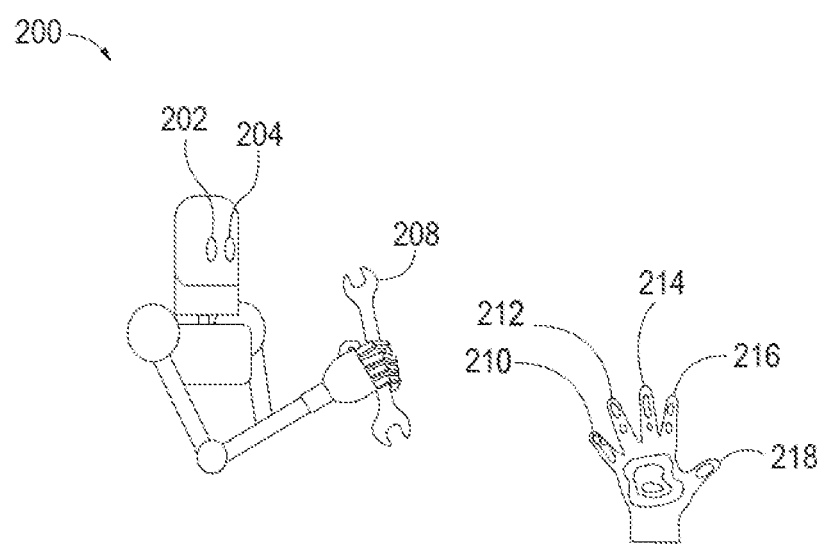
FIG. 2 is an exemplary agent environment of a system for online augmentation for learned grasping, according to one aspect.

In some embodiments, the agent may be the agent 200 shown in FIG. 2. The agent 200 may include a number of sensors. For example, the agent 200 may include a first optical sensor 202, a second optical sensor 204, and a force sensor 206. The first optical sensor 202, the second optical sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 may receive image data 110, depth data 112, and tactile data 114 from the sensors. For example, the sensor module 102 may receive image data 110 from the first optical sensor 202, depth data 112 from the second optical sensor 204, and the tactile data 114 from the force sensor 206. The computing device 104 receives the image data 110, the depth data 112, and the tactile data 114 from the sensor module 102. Therefore, the image data 110, depth data 112, and tactile data 114 is raw sensor data received from their respective sensors.

Likewise, the image data 110, depth data 112, and tactile data 114 may include information about the sensors. For example, suppose the force sensor 206 is able to move. The image data 110, depth data 112, and tactile data 114 may include information about the force sensor 206 such as the relative position of the force sensor 206 to a reference point as measured by a sensor. The reference point may be the first optical sensor 202 or the second optical sensor 204. For example, the depth data 112 may include distance measurements from the second optical sensor 204 to the force sensor 206. Likewise, the tactile data 114 may include dimensions (e.g., width, height, length, etc.) of the force sensor 206. The force censor may measure various forces exerted by (e.g., torque) or experienced by (e.g., resistance) the agent 200.

The sensors 202-206 and/or the sensor module 102 are operable to sense a measurement of data associated with the agent 200, the operating environment 100, the object 208, the environment, and/or the operational systems 106 and generate a data signal indicating said measurement of data. These data signals can be converted into other data formats (e.g., numerical) and/or used by the sensor module 102, the computing device 104, and/or the operational systems 106 to generate other data metrics and parameters. It is understood that the sensors can be any type of sensor, for example, acoustic, electric, environmental, optical, imaging, light, pressure, force, thermal, temperature, proximity, gyroscope, and accelerometers, among others.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes an action space module 124, a transition module 126, and a reward module 128, for online augmentation for learned grasping facilitated by the components of the operating environment 100.

The action space module 124, the transition module 126, and the reward module 128 may be an artificial neural network that act as a framework for machine learning, including deep learning. For example, the action space module 124, the transition module 126, and/or the reward module 128 may be a convolution neural network (CNN). In another embodiment, the action space module 124, the transition module 126, and/or the reward module 128 may further include or implement concatenator, a deep neural network (DNN), a recurrent neural network (RNN), a 3D Convolutional Neural Network (3DCNN) and/or Convolutional Long-Short Term Memory (ConvLSTM).

The computing device 104 is also operably connected for computer communication (e.g., via the bus 108 and/or the communication interface 122) to one or more operational systems 106. The operational systems 106 can include, but are not limited to, any automatic or manual systems that can be used to enhance the agent 200, operation, and/or safety. The operational systems 106 may be dependent on the implementation. For example, the operational system 106 may include a path planning module 130 and a trajectory module 132. The path planning module 130 monitors, analyses, operates the agent 200 to some degree. The path planning module may define a path as a course or direction through space. The path may be defined by a number of waypoints. The trajectory module 132 applies time points to the path, for example, by assigning time stamps to the waypoints. As another example, the operational systems 106 may include manipulating the object 208 to affect a target. The operational systems 106 also include and/or are operably connected for computer communication to the sensor module 102. For example, one or more sensors of the sensor module 102 may be incorporated with the path planning module 130 to monitor characteristics of the environment or the agent 200, for example, based on the tactile data 114.

The sensor module 102, the computing device 104, and/or the operational systems 106 are also operatively connected for computer communication to the network 134. The network 134 is, for example, a data network, the Internet, a wide area network (WAN) or a local area (LAN) network. The network 134 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Online Augmentation for Learned Grasping

Figure 3:
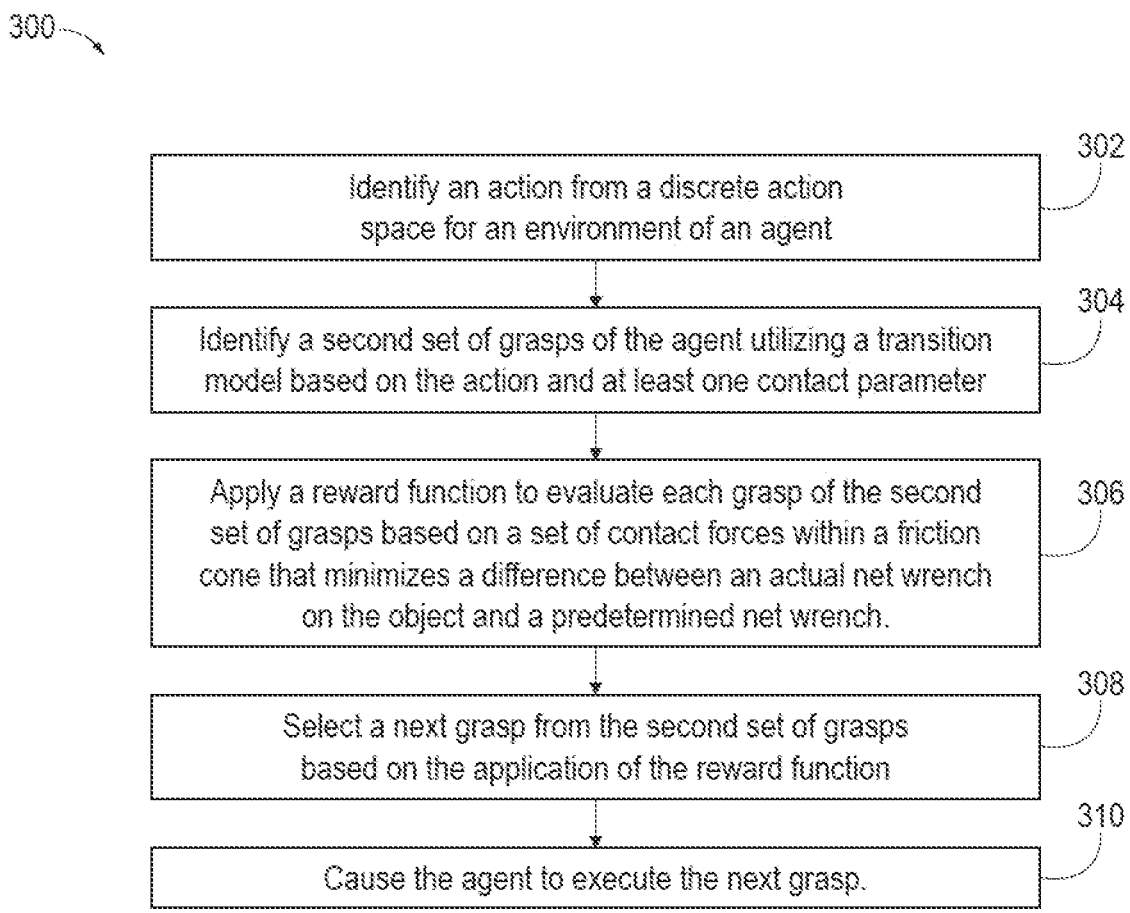
FIG. 3 is an exemplary process flow of a method for online augmentation for learned grasping, according to one aspect.

Referring now to FIG. 3, a method 300 for online augmentation for learned grasping will now be described according to an exemplary embodiment. FIG. 3 will be described with reference to FIGS. 1, 2, 4A-4E, 5, and 6. For simplicity, the method 300 will be described as a sequence of blocks, but it is understood that the blocks of the method 300 can be organized into different architectures, elements, stages, and/or processes.

At block 302, the method 300 includes the action space module 124 identifying an action from the discrete action space. The discrete action space for an environment of the agent 200 includes a first set of actions. The action may be selected based on state information, a known state, or a random selection. The action may be a grasp of the agent 200, joint torque inputs, and displacement of fingers, among others. For example, as described above the agent 200 is able to grasp an object 208 in the environment using one or more links. In an embodiment with an at least partially humanoid robot, the grasp may be performed by links. In this manner, links are portions of the agent 200 used in contact with the object 208 to achieve a grasp.

In one embodiment the links may include a number of end effector(s) that operate to mimic the function of human fingers. For example, the agent 200 may include a first end effector 210, a second end effector 212, a third end effector 214, a fourth end effector 216, and a fifth end effector 218 that is opposable such that it can move toward and touch the other end effector 210-216. When in contact with the object 208, the end effector 210-218 are links of the agent 200 with the object 208. The links may also include other portions of an agent 200 such as a grasper, rod, or clamp, among others.

The discrete state space may include any grasp that can achieved by the agent 200 based on the state of the agent 200. The state of the agent 200 may include state information such as agent state information about the agent 200. The agent state information defines a configuration of the agent 200 at a given time. For example, the agent state information may include a base position $p_h$, orientation $R_h$, and joint positions, q, of the agent 200. The agent state information may additionally include the agent base trajectory $\{p_h(t), R_h(t)\}$ of the agent 200 at the first time, such as the current time, $t_0$.

The state of the agent 200 may also include object state information. The object state information defines a configuration of the object 208 at a given time, such as an object pose $\{p_o, p_R\}$, linear velocity $p'_o(t)$, angular velocity $\omega_o$, and the object reference trajectory $\{p_o(t), p_R(t)\}$ of the object 208. Because the discrete state space may include any grasp that can be achieved by the agent 200, the discrete state space includes the first set of grasps for the first time.

The discrete state space may be represented as an array of integers with one integer per link of the agent 200. The first set of grasps is based on an initial grasp of the object 208 at a first time. For example, the first set of grasps may include one or more contact point pairs $\{p_o, p_R\}$ where $p_o$ is an object contact point on the object 208 in the object's reference frame and $p_R$ is an agent contact point on the agent 200 in the agent's reference frame. Each instance where a link of the agent 200 is or may be in contact with the object 208 is represented in a contact point pair. For example, the first end effector 210, the second end effector 212, the third end effector 214, and so on of the agent 200 may be represented in a contact point pair. The first set of grasps includes each of the one or more contact pairs representing points of contact of the agent 200 with the object 208.

The state information may be received or determined from the sensor module 102 or the operational systems 106. For example, the image data 110 may correspond to the portion of the object 208 that is not occluded by the grasp of the agent 200 or the environment. For example, as shown in FIG. 2, the agent 200 is holding an object 208, shown here as a wrench, with a force sensor 206 represented by the end effectors 210-218 of the agent 200. The image data 110 may be image data, such as RGB data, YCB data, and/or YUV data. The image data may be used to determine a joint configuration of the end effectors 210-218 of the agent.

The state information may also be based on the depth data 112 about the object 208. The depth data 112 may be received from the second optical sensor 204. The depth data 112 may include a video sequence or a series of images, user inputs, and/or data from the operational systems 106, such as data from a Controller Area Network (CAN) bus including as pedal pressure, steer angle, etc. The depth data 112 may be received from the second optical sensor 204. The second optical sensor 204 may include radar units, lidar units, image capture components, ranging sensors, cameras, scanners (e.g., 2-D scanners or 3-D scanners), or other measurement components. For example, the depth data 112 from the second optical sensor 204 may be augmented by other sources, such as the first optical sensor 202, and/or remote devices (e.g., via the bus 108 and/or the communication interface 122).

The state information may also be based on the tactile data 114 received from the force sensor 206. The force sensor 206 may include tensile force sensors, compressions force sensors, tensile and force compression sensors, or other measurement components. The force sensor 206 may be with a Weiss gripper with GelSight tactile sensors. In some embodiments, the tactile data 114 is augmented as additional sensor data from other sources is received. For example, the tactile data 114 from the force sensor 206 may be augmented by other sources, such as additional force sensors (e.g., from a second hand of the agent 200), and/or remote devices (e.g., via the bus 108 and/or the communication interface 122). The action space module 124 may determine the agent contact points and the object contact points based on the tactile data 114.

The action space module 124 may also use the operational system 106, including but not limited to the agent systems, to determine the state information. For example, the trajectory module 132 may provide the action space module 124 with state information from previous time steps. Based on the state information from the previous time steps, the action space module 124 may determine current state information, such as a current joint configuration of the end effector 210-218 of the agent 200. Therefore, using the image data 110, the depth data 112, the tactile data 114, and/or the operational systems, the action space module 124 may determine the first set of grasps includes each of the one or more contact pairs representing points of contact of the agent 200 with the object 208.

At block 304, the method 300 includes the transition module 126 identifying a second set of grasps of the agent utilizing a transition model based on the action and at least one contact parameter. The second set of grasps, may include one second grasp corresponding to the identified action. If a set of actions is identified from the action space, then the second set of grasps may include a plurality of grasps.

The at least one contact parameter defines allowed states of contact for the agent. The transition function is based on simulated and/or real physical dynamics. The agent reference trajectory and the object reference trajectory are represented by a final target position of the agent 200 or the object 208 and a receding horizon, i.e., the first upcoming waypoint after time to. The transition module 126 may utilize a generalized simulation based on the first set of grasps using simplified physics to identify the second set of grasps. For example, the transition module 126 may use heuristics that are an evaluation of contacting forces between the links and the object 208.

The at least one contact parameter defines allowed states of contact for the agent 200 with respect to the object 208. Contact parameters may define a number of links that can be adjusted to achieve a grasp, identify specific links, individually or with respect to other links, or define the manner in which a link may contact the object 208, among others. For example, a contact parameter may define that the agent 200 be able to move one link to achieve a grasp in a specific time step, such as from $t_0$ to $t_1$. The predetermined number of links may specify specific links, such as the first end effector 210 and the second end effector 212, that may be adjusted to achieve a grasp. Alternatively, the predetermined number of links may dictate that any two links of the end effectors 210-218 may be adjusted to achieve a grasp.

In the contact parameters, adjusting a link may include adding a link to the object 208, removing a link from the object 208, sliding a link along the object 208, etc. A contact parameter may include moving a link from a first agent contact point on the object 208 to a second agent contact point on the object 208. In this manner, the contact parameters define the allowed states of contact for the agent 200 based on the links of the agent 200. A contact parameter may define a set of actions associated with the object including one or more of roll, turn, and flip the object.

The contact parameters may additionally or alternatively define allowed states based on object contact points of the object 208. A contact parameter may define a number of predetermined contact points on the object 208 for a given link or any link. For example, if the object 208 includes a first object contact point, a second object contact point, and a third object point contact point, a contact parameter may limit the agent 200 to moving the first end effector 210 to a first object contact point or a second contact point on the object 208. The contact parameter may limit the second end effector 212 to the third object contact point. Alternatively, any link may be limited to the first object contact point or the second object contact point. In one embodiment, the number of object contact points are based on a virtual grid associated with the object 208. The size of the virtual grid may be proportional to the size of the object 208.

Turning to FIGS. 4A-4E, an example of nominal grasp is shown. For example, FIG. 4A illustrates an example, of a starting position for all paths. FIG. 4B illustrates an initial grasp having normal contacts 402 and 404 and commanded contacts 406 and 408. FIG. 4C illustrates the second end effector 212 is added for stability. FIG. 4D illustrates that the third end effector 214 and the fourth end effector 216 move one at a time, slide underneath the tool, according to at least one contact parameter. The result is actual contact 410. FIG. 4E illustrates that the first end effector 210 moves in preparation for the applied phantom torque, for example +1 Nm in the Z-direction relative to the center-of-mass.

In the transition model, one or more contact parameters may be applied to the discrete action space, which may include all possible grasps by the agent 200 given the state of the agent 200. For example, a grasp, represented as an array of integers with one integer per link, defining the discrete contact position of that link (or 0 if the link is not in contact). The array is combined with the other elements of the state information to yield the final environment state. The grasp command and the discretized trajectory waypoints may not make the state space discrete. No restrictions are imposed on the current tool position or joint states, which can remain continuous. However, during offline training, at least one contact parameter may be imposed. In one embodiment, the restriction may be imposed under the assumptions. A first contact parameter may include the tool adheres to the reference trajectory, so that all possible current tool positions come from a discrete set of waypoints. Additionally or alternatively, a second contact parameter may include a given grasp is realized as well as possible without collision, as defined by inverse kinematics with a fixed initial joint configuration. This defines a unique joint configuration for a given discrete tool position and grasp command.

From these contact parameters, a given reference trajectory, grasp, and discrete time step, a unique discrete state may be determined. The model-based grasp sequence planning for determining the grasp used at each sample on the trajectory may be implemented by setting a goal to find a sequence of grasps that is feasible in terms of contact points and object trajectory tracking. The grasp sequence planner may set $f_E=0$ and $\tau_E=0$ e.g., no external wrench is applied to the object. For example, dynamic programming (DP) may be utilized by the transition module 126 for the transition model. For example, given the number of links and defined contact points in $G_{cand}$ which generates two hundred and eighty-eight discrete states per time step per reference trajectory. This corresponds with all possible reference grasp commands: 3 possible fifth end effector 218 contact states×6 possible fourth end effector 216 contact states (with 2 links)×8 possible third end effector 214 contact states (with 2 links), ×2 possible second end effector 212 contact states.

The action space is defined by the complete grasp set G, which is already discrete. However, this is subject to the one or more contact parameters, such as only one link can be modified (either added, removed, or slid) at a time. Therefore, the complete action space can be described even more compactly as:

$$A=\{\emptyset\}L\{(\text{link,contact})\forall \text{contact} \in G\}$$

In other words, in addition to the null action which maintains the current grasp, a reference grasp, $\hat{G}(t)$ includes an action of selecting which link to modify, and which new contact point to command it to (or 0 to remove it from contact). Given the number of links and defined contact points in $G_{cand}$, this procedure generates 16 possible actions per time step (including the null action).

At block 306, the method 300 includes the reward module 128 applying a reward function to evaluate each grasp of the second set of grasps based on the set of contact forces within or on the edge of a friction cone that minimizes the difference between an actual net wrench on the object and a predetermined net wrench and is represented by $R_{min}$. Additionally or alternatively, the reward function may evaluate each grasp on other terms in the reward function, such as kinematical reachability of the grasps, amount of force exerted by each finger, etc. In some embodiments, the reward module 128 may calculate a reward for a node at an offline time during training and an online time during operation or a test. For example, at test time, the reward may be calculated using the context of the problem at test time, and allows for online optimization in the lookahead tree. The reward function is learned during training and optimized using the lookahead tree that calculates the optimal path for the grasping. The reward function may be applied using reinforcement learning. This is in contrast with previous solutions in traditional reinforcement learning where no reward is calculated at test time, the policy trained by optimizing the training-time reward is just used as-is. Accordingly, the reward function may be applied dynamically.

A reward model is employed by the reward module 128 to mirror a trajectory controller while relying solely on the relatively computationally simple inverse kinematics (IK) and Wrench error calculations. Because the discrete action space allows for the possibility of redundant actions, namely, commanding a link to a contact point that is already commanded by the current reference grasp. These redundant actions are given a minor negative reward.

The reward module 128 also determines the ability of the agent 200 to establish the desired reference grasp at the current tool position. This step corresponds with establishing the reference grasp and the inverse kinematics may be performed iteratively. For example, a first inverse kinematics procedure is run with the provided initial joint configuration to determine an optimal possible joint positions for the reference grasp that can achieved without collision. The resulting contact points are evaluated using the wrench error with respect to gravity and the forces necessary to move the object along the reference trajectory at the current time step. If inverse kinematics detects a likely collision with the fixed environment or if the wrench error exceeds a threshold such that it is likely that the agent 200 will lose its grip on the object 208, the step will immediately return Rug, and the episode will end. Otherwise, only the wrench error is added to the reward, as will be discussed in greater detail below. With the reference grasp established, it is then determined how well the agent 200 can repose the tool to the upcoming trajectory waypoint. A second inverse kinematics procedure may be run at a second time against the upcoming tool reference pose and the joint configuration and contact points returned from the first inverse kinematics procedure.

The result is an estimate of where the contact points will end up after the repose procedure. At this stage, the inverse kinematics error is added to the reward as well as an estimate of uncertainty in the simulation. Then, the contact points are evaluated using the wrench error with respect to gravity, the forces necessary to move the object at this point in the reference trajectory, and, at the final time step, the final external wrench $w_{ext}$. As before, if inverse kinematics detects a collision or the wrench error exceeds the falling threshold, $R_{min}$ is returned and the episode ends. In the case where contact establishment requires a slide action, an additional reward term penalizes more difficult slide actions. However, if the wrench error associated with completely removing the sliding finger exceeds the falling threshold (a situation that is likely to happen during sliding in simulation if the finger temporarily loses contact), the step will immediately return $R_{min}$ and the episode will end.

In this manner, the reward module 128 may include two components: inverse kinematic error and wrench error. As discussed above, the inverse kinematic error may be performed iteratively. The inverse kinematic error may include a gradient descent planner from some fixed starting joint configuration such as an initial grasp. The gradient descent planner may not include an evaluation of the physics of the kinematics. For example, the inverse kinematic error may be represented as:

$$\Delta q = \mathrm{argmin} Z_{IK}$$

$$q := q + k_{IK}\Delta q$$

$$\frac{1}{k_{IK}}(q_{min} - q) \le \Delta q \le \frac{1}{k_{IK}}(q_{max} - q), \text{ where}$$

$$Z_{IK} = \sum_{k=1}^{K} \|J_{Ck}\Delta q - \Delta p_k\|^2$$

$$\Delta p_k = p_k - (p_{Jk}(q) + R_{Jk}(q)C_{Jk})$$

$k_{IK}$ may be a positive gain, $J_{Ck}$ may be the Jacobian matrix of contact point k with respect to q, $p_{Jk}(q)$ and $R_{Jk}(q)$ denote the pose of joint $J_k$ at q and $q_{max}$ and $q_{min}$ may be the vector of maximum and minimum joint positions, respectively.

The result is a new joint configuration and a set of effective contact points $\{p_{R,\omega}\}$. The ability of the agent 200 to determine a grasp is represented by inverse kinematics error. The inverse kinematics error is given as the $\max_{all\ links} \|p_{R,\omega} - p_{0,\omega}\|$, the largest error between the target contact point on a link of the agent 200 and the target contact point on the object 208.

The ability of a grasp to maintain the desired motion of the object under any external forces and torques, including gravity, is evaluated using the wrench error. The wrench error may find the set of contact forces within (e.g., sticking contacts) or on (e.g., sliding contacts) the friction cone that minimizes the difference between the net wrench on the object 208 and the desired net wrench. In some embodiments, an additional term in this metric penalizes the sum of the square norm of each contact force to penalize types of grasps. For example, the additional term may be a metric that functions to penalize grasps with links less than a predetermined number of links, links having contact forces higher than a threshold contact force, and grasps with redundant contact forces, among others. The additional term may be determined based on a sum of a square norm of each contact force per contact point pair. For example, the wrench error may be represented as:

$$e^*(m, G) = \left\|\hat{f}_{total} - \sum_{k=1}^{K} f_k^*\right\|^2 + \omega_t \left\|\hat{\tau}_{total} - \sum_{k=1}^{K} p_{Ok} \times f_k^*\right\|^2$$

By performing applying the reward model iteratively, the reward module 128 may calculate the two-component reward function as a first inverse kinematics error for a first tool pose and a first grasp and a first wrench error at a first time given the state information and the initial grasp. The reward module 128 may then calculate a second inverse kinematics error for a second tool pose and a second grasp and a second wrench error at a second time, and so on. If the max value of the first wrench error and the second wrench error fails a wrench error threshold or the inverse kinematics errors indicate a collision, a minimum reward is applied. Otherwise, the result of applying the reward function is the sum of the first wrench error, the second wrench error, and the second inverse kinematics error.

In some embodiments, at the end of the reference trajectory at time $T_{end}$, $\omega_{ext}$ is applied to the object 208 for an unknown time $T_{eval}$. Given any collision, the episode ends with the minimum reward $R_{min}$, otherwise, the following cost is incurred:

$$\int_{t=T_{end}}^{T_{end}+T_{eval}} [\|p_0(t) - p_0^d\|_2^2 + \text{angle}(R_0(t), R_0^d)] dt$$

For a given action, the reward module 128 calculates the reward. Continuing the example from above, the reward associated with each discrete state-action-time triplet may be recorded, for a total of approximately 73 k (288 states×16 actions×16 time steps). States that do not satisfy the contact parameters (e.g. requiring moving more than one finger at a time) may be assigned a reward of −∞. The generation of these reward matrices took approximately 5000 CPU-s (or about 150 s of wall time when run in parallel. In some embodiments, DP may be utilized based on the reward matrices. Running the DP may take less than 1 s per trajectory, thereby improving the functioning of the computing device.

At block 308, the method 300 includes the reward module 128 selecting a next grasp from the second set of grasps based on the application of the reward function. The next grasp may include torques to be applied by the links to move the object 208 to a target position by applying an appropriate external wrench. For example, the reward module 128 may utilize the reward matrices generated above to not only calculate the optimal policy from the start state, but calculate the optimal action and the theoretical value of any state. In other words, a behavior cloning dataset of discrete state-action pairs and a value dataset of nominal state-value pairs can be constructed. These datasets can be used to pre-train the policy and value networks respectively of the agent 200 using reinforcement learning.

In general, model-free reinforcement learning (RL) can overcome all of these limitations through the function approximating power of neural networks. However, this comes at the cost of data efficiency. RL needs enough data to be able to approximate the loss and reward functions on top of actually solving for the optimal policy. Additionally, RL can still suffer from divergence in the training and test distributions. To adapt an RL-trained policy to a new or perturbed environment without incurring the significant training costs or resorting to the recalculating the optimal policy from scratch with DP, an online l-step lookahead and m-step rollout algorithm may be used.

Lookahead can be interpreted as performing DP on the environment with time horizon. The terminal reward is determined by rolling out some baseline policy for m steps or until the end of the episode. In the former case, a trained value function may be used as the terminal reward of the rollout. The search tree and rollouts are executed in the new or perturbed environment. Lookahead provides tunable hyperparameters l-step lookahead and m-step to manage the trade-off between the high computational complexity of DP and any sub-optimality present in the underlying RL model. Accordingly, the reward function may be optimized using a lookahead tree In some embodiments, given the target position of the object 208, and path is planned for both the agent 200 and the object 208 such that at all nodes in the path there exists at least one feasible grasp from the second set of grasps. The next grasp may be selected such that the total inverse kinematic error and the wrench error over a trajectory of the agent 200 and/or the object 208 is minimized. This may be performed iteratively with respect to the trajectory to form a tree having a number of nodes each predicting one or more next grasps based on the previous grasp. The nodes may be evaluated based on a reward function that rewards the agent having a stable grasp on the object and penalizes unstable grasps of the object. For example, the reward function may evaluate each node based on the set of contact forces within a friction cone that minimizes the difference between an actual net wrench on the object and a predetermined net wrench. Likewise, the reward function may penalize grasps with higher force per contact point pair and grasps with redundant contact forces. Grasps may be selected for the agent at discrete points in time based on the evaluation of the nodes, thereby reducing the amount of computation time and training data. As discussed above, the trajectory may include a number of way points having one or more next grasps such that the total inverse kinematic error and the wrench error over a trajectory of the agent 200 and/or the object 208 is minimized. The trajectory for object 208 may be given as $\{p_O(t), R_O(t)\}$ and the trajectory for agent 200 may be given as $\{p_h, R_h(t)\}$. The result is an un-timed collision-free object path that can be physically realized by the agent 200.

At block 310, the method 300 includes the path planning module 130 causing the agent 200 to execute the next grasp. The path planning module 130 may receive a reference object pose $\{p_O(t), R_O(t)\}$ and a reference grasp $\hat{G}(t)$. The path planning module 130 may then cause agent 200 to move the object 208 to the final target position or a way point on a trajectory with a grasp that can effectively manipulate the object 208. For example, the path planning module 130 may cause the links of the agent 200 to exert a mechanical force on a target using an object. Additionally or alternatively, a policy can be generated based on the reward function using the contact point pairs to pretrain the agent 200 or another agent 200 on the operation of an object with respect to a target.

In this manner, the reward matrices may be used not only calculate the optimal policy from the start state, but calculate the optimal action and the theoretical value of any state. In other words, a behavior cloning dataset of discrete state-action pairs and a value dataset of nominal state-value pairs may be constructed. These datasets can be used to pre-train the policy and value networks.

Figure 5:
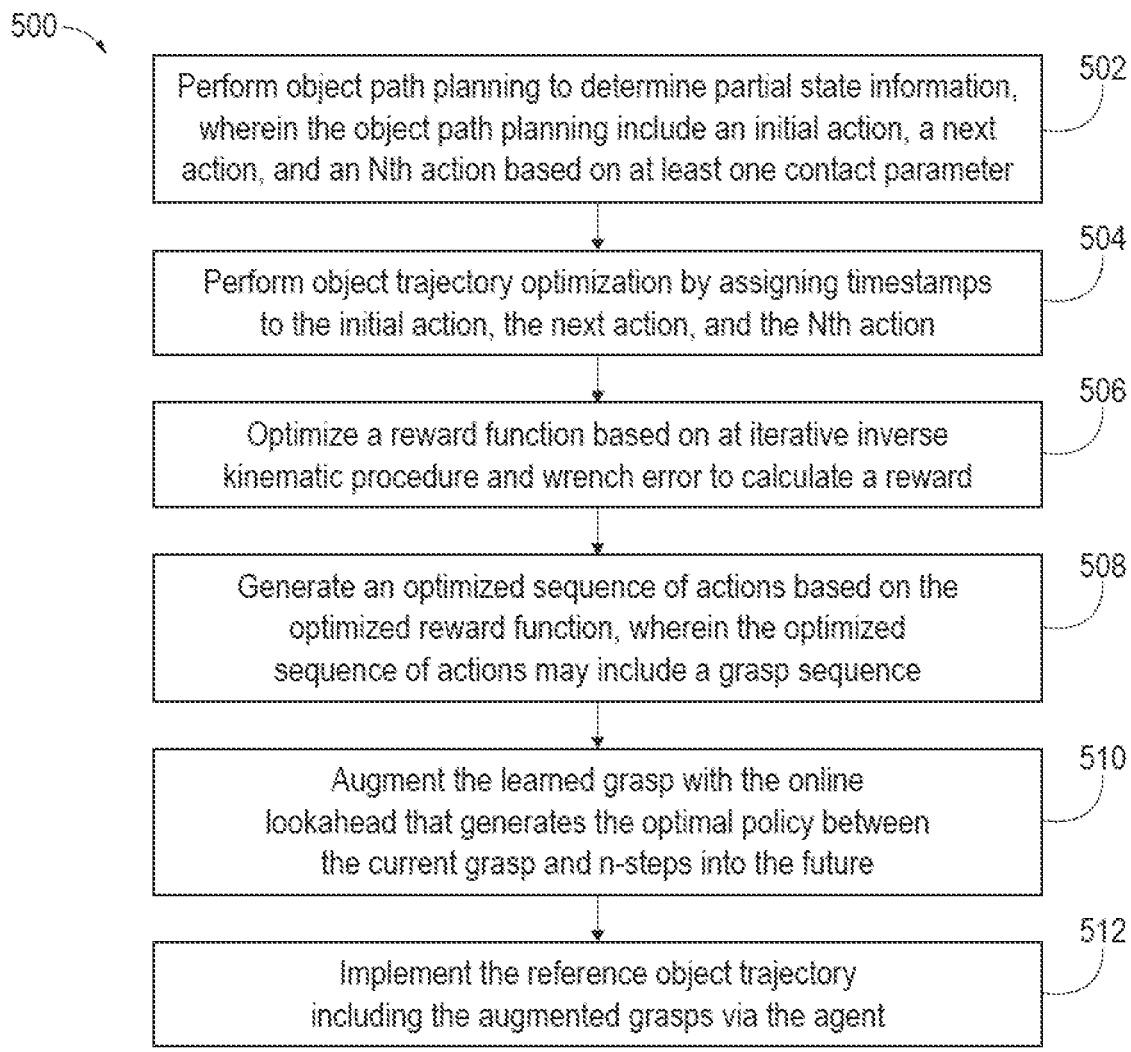
FIG. 5 is a flow diagram illustrating a method for augmentation for learned grasping, according to one aspect.

FIG. 5 is a flow diagram illustrating a method 500 for online augmentation for learned grasping, according to one aspect. The method 500 for object manipulation may include, at block 502, performing object path planning to determine partial state information. The object path planning may include an initial action, a next action, and an Nth action based on at least one contact parameter. The path planning may be performed by the path planning module 130. A grasp, such as the initial action, the next action, and/or the Nth action is defined as at least one contact point pair having an agent contact point associated with the agent and an object contact point associated with the object. The at least one contact parameter defines allowed states of contact for the agent.

At block 504, the method 500 includes performing object trajectory optimization by assigning timestamps to the initial action, the next action, and the Nth action. The timestamps may be assigned by the trajectory module 132. By performing object trajectory optimization, the timestamped state information is determined. The timestamped state information along with other state information such as grasps and object pose information, or external forces applied to the object are the information used by the agent 200 to determine the actions.

At block 506, the method 500 includes optimizing a reward function based at iterative inverse kinematic procedure and wrench error. The reward may be based on a difference between an estimated required wrench and an actual wrench. The reward may be calculated for a node at an offline time during training and an online time during operation or a test. For example, at test time, the reward may be calculated using the context of the problem at test time, and allows for online optimization in the lookahead tree.

At block 508, the method 500 includes and generating an optimized sequence of actions based on the optimized reward function. The optimized sequence of actions may include a grasp sequence. For example, the trajectory module 132 may generate a grasp sequence, as shown with respect to FIGS. 4A-4E, based on the transition model having at least one contact parameter. The grasp sequence planning may be based on a deep reinforcement learning (DRL) policy trained based on a reward function.

At block 510, the method 500 includes augmenting the learned grasp with the online look ahead. The online lookahead generates the optimal policy between the current grasp and n-steps into the future. The online lookahead may be run for n-steps and DRL policy is run for the steps n+1 till the end. At block 512, the method 500 includes implementing the reference object trajectory including the augmented grasps via the agent 200.

Figure 6:
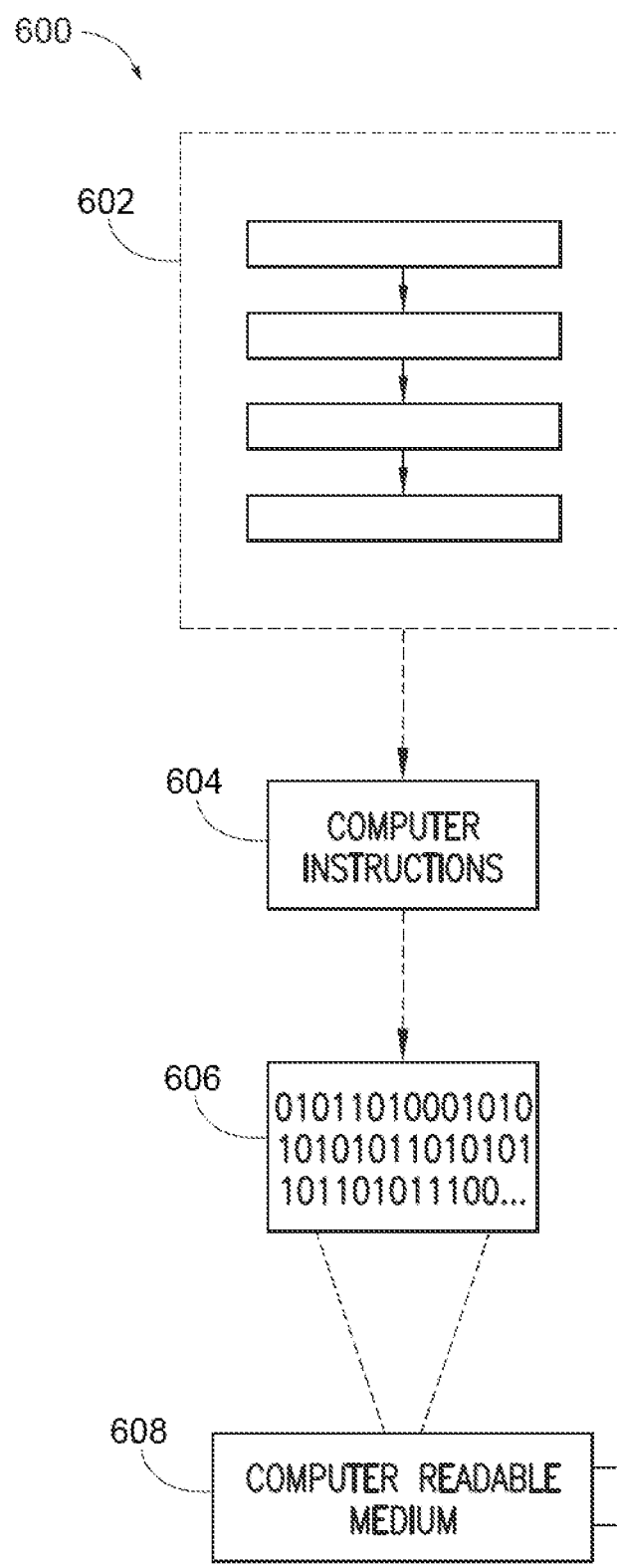
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein.

In this implementation 600, the processor-executable computer instructions 604 may be configured to perform a method 602, such as the method 300 of FIG. 3 and or the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes," "having," "has," "with," or variants thereof are used in either the detailed description or the claims, such terms are intended to be inclusive in a manner similar to the term "comprising."

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for online augmentation for learned grasping, comprising:
   a processor; and
   a memory storing instructions that when executed by the processor cause the processor to:
   identify an action from a discrete action space for an environment of an agent, wherein the discrete action space includes a first set of grasps; wherein the agent is able to grasp an object in the environment, and wherein the action is a grasp that is defined as at least one contact point pair having an agent contact point associated with the agent and an object contact point associated with the object;
   identify a second set of grasps of the agent based on a transition model and at least one contact parameter, wherein the agent is able to grasp the object in the environment, wherein a grasp is defined as at least one contact point pair having an agent contact point associated with the agent and an object contact point associated with the object, and wherein the at least one contact parameter defines allowed states of contact for the agent;

apply a reward function to evaluate each grasp of the second set of grasps based on a set of contact forces within a friction cone that minimizes a difference between an actual net wrench on the object and a predetermined net wrench, wherein the reward function is iteratively optimized online using a lookahead tree having a plurality of nodes, each node of the plurality of nodes predicting one or more next grasp states amongst the second set of grasps;

select a next grasp from the second set of grasps based on a reward value of the reward function associated with the plurality of nodes; and cause the agent to execute the next grasp.

2. The system of claim 1, wherein the agent has a plurality of end effector, and wherein the at least one contact parameter defines that the agent be able to move only one end effector to achieve a grasp.

3. The system of claim 1, wherein the at least one contact parameter defines a number of predetermined object contact points.

4. The system of claim 3, wherein a virtual grid associated with the object provides a basis for the number of predetermined object contact points and a size of the virtual grid is proportional to a size of the object.

5. The system of claim 1, wherein the at least one contact parameter defines a set of actions associated with the object including one or more of roll, turn, and flip the object.

6. The system of claim 1, wherein the reward function is determined iteratively for each node in the lookahead tree based on inverse kinematics and wrench error.

7. The system of claim 1, wherein the reward function further includes an additional term that penalizes grasps with higher force per contact point pair and grasps with redundant contact forces.

8. The system of claim 7, wherein the additional term is determined based on a sum of a square norm of each contact force per contact point pair.

9. The system of claim 1, wherein the reward function is applied using reinforcement learning.

10. The system of claim 1, wherein the object is a tool for exerting a force on a target.

11. A method for online augmentation for learned grasping, comprising:

identifying an action from a discrete action space for an environment of an agent, wherein the discrete action space includes a first set of grasps; wherein the agent is able to grasp an object in the environment, and wherein the action is a grasp that is defined as at least one contact point pair having an agent contact point associated with the agent and an object contact point associated with the object;

identifying a second set of grasps of the agent based on a transition model and at least one contact parameter, wherein the agent is able to grasp the object in the environment, wherein a grasp is defined as at least one contact point pair having an agent contact point associated with the agent and an object contact point associated with the object, and wherein the at least one contact parameter defines allowed states of contact for the agent;

applying a reward function to evaluate each grasp of the second set of grasps based on a set of contact forces within a friction cone that minimizes a difference between an actual net wrench on the object and a predetermined net wrench, wherein the reward function is iteratively optimized online using a lookahead tree having a plurality of nodes, each node of the plurality of nodes predicting one or more next grasp states amongst the second set of grasps;

selecting a next grasp from the second set of grasps based on a reward value of the reward function associated with the plurality of nodes; and causing the agent to execute the next grasp.

12. The method of claim 11, wherein the agent has a plurality of end effector, and wherein the at least one contact parameter defines that the agent be able to move only one end effector to achieve a grasp.

13. The method of claim 11, wherein the at least one contact parameter defines a number of predetermined object contact points.

14. The method of claim 13, wherein a virtual grid associated with the object provides a basis for the number of predetermined object contact points and a size of the virtual grid is proportional to a size of the object.

15. The method of claim 11, wherein the at least one contact parameter defines a set of actions associated with the object including one or more of roll, turn, and flip the object.

16. The method of claim 11, wherein the reward function further includes an additional term that penalizes grasps with higher force per contact point pair and grasps with redundant contact forces.

17. The method of claim 16, wherein the additional term is determined based on a sum of a square norm of each contact force per contact point pair.

18. The method of claim 11, wherein the reward function is applied using reinforcement learning.

19. The method of claim 11, wherein the object is a tool for completing a mechanical task of exerting a force on a target.

20. A method for augmentation for learned grasping of an agent, comprising:

performing object path planning to determine partial state information, wherein the object path planning includes an initial action, a next action, and an Nth action for the agent with respect to an object, wherein the initial action, the next action, and the Nth action are grasps based on at least one contact parameter, wherein a grasp is defined as at least one contact point pair having an agent contact point associated with the agent and an object contact point associated with the object, and wherein the at least one contact parameter defines allowed states of contact for the agent;

performing object trajectory optimization by assigning timestamps to the initial action, the next action, and the Nth action;

optimizing a reward function based on an iterative inverse kinematic procedure and wrench error to calculate a reward, wherein the reward may be based on a difference between an estimated required wrench and an actual wrench, and wherein the reward is calculated for a node at an offline time during training and an online time during operation or a test;

generating an optimized sequence of actions based on the optimized reward function based on a deep reinforcement learning (DRL) policy trained;

iteratively augmenting the learned grasp with an online lookahead tree having a plurality of nodes, each node of the plurality of nodes predicting one or more next grasp states, wherein the online lookahead tree generates an optimal policy between a current grasp and n-steps into the future based on the reward of the reward function associated with the plurality of nodes; and implementing the reference object trajectory including the augmented grasps via the agent.

* * * * *